United States Patent
Sapp et al.

(10) Patent No.: US 7,934,025 B2
(45) Date of Patent: Apr. 26, 2011

(54) CONTENT TERMINATED DMA

(75) Inventors: Kevin Allen Sapp, Cary, NC (US);
James Norris Dieffenderfer, Apex, NC (US)

(73) Assignee: QUALCOMM Incorporated, San Diego, CA (US)

( * ) Notice: Subject to any disclaimer, the term of this patent is extended or adjusted under 35 U.S.C. 154(b) by 333 days.

(21) Appl. No.: 11/626,414

(22) Filed: Jan. 24, 2007

(65) Prior Publication Data
US 2008/0177909 A1   Jul. 24, 2008

(51) Int. Cl.
G06F 13/28 (2006.01)
(52) U.S. Cl. ............................ 710/22; 710/26; 710/28
(58) Field of Classification Search ............... 710/44, 710/22, 48, 55, 26, 28
See application file for complete search history.

(56) References Cited

U.S. PATENT DOCUMENTS

| | | | | |
|---|---|---|---|---|
| 6,081,852 A * | 6/2000 | Baker | ............... | 710/24 |
| 6,157,971 A * | 12/2000 | Gates | ............... | 710/100 |
| 6,185,634 B1 * | 2/2001 | Wilcox | ............... | 710/26 |
| 6,192,492 B1 * | 2/2001 | Masiewicz et al. | ............... | 714/56 |
| 6,611,879 B1 * | 8/2003 | Dobecki | ............... | 710/1 |
| 6,681,273 B1 * | 1/2004 | Allen et al. | ............... | 710/52 |
| 6,754,733 B2 * | 6/2004 | Hansen | ............... | 710/22 |
| 6,775,719 B1 * | 8/2004 | Leitner et al. | ............... | 710/33 |
| 6,826,354 B2 * | 11/2004 | Tezuka | ............... | 382/218 |
| 6,831,916 B1 * | 12/2004 | Parthasarathy et al. | ............... | 370/359 |
| 6,901,468 B1 * | 5/2005 | Paluzzi | ............... | 710/116 |
| 6,904,473 B1 | 6/2005 | Bloxham et al. | | |
| 7,200,688 B2 | 4/2007 | Day et al. | | |
| 7,299,302 B2 | 11/2007 | Muro | | |
| 2007/0162709 A1 * | 7/2007 | Arataki et al. | ............... | 711/154 |
| 2007/0168779 A1 * | 7/2007 | Regev et al. | ............... | 714/718 |
| 2008/0126662 A1 * | 5/2008 | Rajbharti | ............... | 710/308 |
| 2008/0148083 A1 * | 6/2008 | Pesavento et al. | ............... | 713/322 |
| 2008/0313357 A1 * | 12/2008 | Wang et al. | ............... | 710/14 |

FOREIGN PATENT DOCUMENTS
EP   1271329   1/2003

OTHER PUBLICATIONS

International Search Report—PCT/US08/051965—International Search Authority, European Patent Office—Sep. 24, 2008.
Written Opinion—PCT/US08/051965—International Search Authority, European Patent Office—Sep. 24, 2008.

* cited by examiner

*Primary Examiner* — Chun-Kuan Lee
*Assistant Examiner* — Ernest Unelus
(74) *Attorney, Agent, or Firm* — Nicholas J. Pauley; Jonathan T. Velasco

(57) ABSTRACT

A Content-Terminated Direct Memory Access (CT-DMA) circuit autonomously transfers data of an unknown length from a source to a destination, terminating the transfer based on the content of the data. Filter criteria are provided to the CT-DMA prior to the data transfer. The filter criteria include pattern data that are compared to transfer data, and transfer termination rules for interpreting the comparison results. Data are written to the destination until the filter criteria are met. Representative filter criteria may include that one or more units of transfer data match pattern data; that one or more units of transfer data fail to match pattern data; or that one or more units of transfer data match pattern data a predetermined number of times.

33 Claims, 3 Drawing Sheets

CONTENT TERMINATED DMA

BACKGROUND

The present invention relates generally to Direct Memory Access (DMA) circuits in computing systems, and in particular to a DMA that terminates data transfers in response to value(s) of the data being transferred.

Modern computing systems—including those in portable electronic devices—process massive amounts of data, such as digital data representing photographs, graphic images, video, audio, and the like. This data must be transferred within the computing system, such as from an Input/Output (I/O) peripheral device into memory, from memory into a graphic frame buffer, from one area of memory to another—in general, from a data source to a data destination. A known technique to accomplish intra-system data transfer without burdening a processor is to include a Direct Memory Access (DMA) circuit, also known as a DMA controller.

A processor initializes the DMA controller with source and destination information (either of which may comprise memory addresses or peripheral ports) and a transfer count, such as by writing the information to control registers in the DMA controller, or by writing control blocks in memory and placing a pointer to them in a DMA controller register. Upon receiving a GO indication or command from the processor, the DMA controller autonomously reads data from the source and writes it to the destination, repeating the process until the specified number of data units has been transferred. Sophisticated DMA controllers may include multiple channels, and may handle many low-level data transfer tasks, such as scatter/gather operations to transfer data between units having different word sizes. It is also known to chain DMA transfers. In chained operations, the DMA controller is provided or directed to information for a subsequent DMA transfer (e.g., a new source, destination, count, and the like), which it begins upon termination of an ongoing DMA transfer.

The processor cannot always know a priori the length of a collection of data requiring a transfer within the computing system. For example, to copy a character string (such as "Hello world"), each character is retrieved from a source location, placed in a register, and compared to zero (the C language string termination character). If the comparison fails, the character is written to a destination location and the next character is read and compared. The data transfer is complete when the processor encounters a zero in the character string. This is a processor-intensive task, and additionally one that includes a very large number of memory accesses. If the source and/or destination addresses are non-cacheable, the CPU may spend considerable time waiting for the memory operations to complete, particularly in systems where memory accesses are much slower than processor execution. This severely degrades processor performance.

The data transfer task is generally not off-loaded to a conventional DMA controller, since the length of the character string is unknown. Conventional DMA controllers have no ability to inspect the data they transfer, and "blindly" transfer a specified amount of data from a source to a destination. The length of a character string is determined by comparing each character to a known data pattern. This comparison is conventionally performed by a processor. For the processor to off-load the data transfer task to a conventional DMA controller, it would have to successively read and compare characters to determine the string length, and then formulate a DMA operation, with a transfer count. However, since doing so performs half of the data transfer task (reading), processors in systems with conventional DMA controllers simply write each character to the destination directly, and halt the process when the known data pattern demarking the end of the string is detected.

Other protocols terminate data strings with multiple characters. For example, in the Hyper-Text Markup Language (HTML), a string to receive certain formatting or handling is terminated by the sequence </keyword>, which requires a plurality of successive character comparisons to detect.

SUMMARY

In one or more embodiments disclosed and claimed herein, a Content-Terminated Direct Memory Access (CT-DMA) circuit performs DMA transfers of data of an unknown length, terminating the transfer based on the content of the data. Filter criteria are provided to the CT-DMA prior to the data transfer. The filter criteria include pattern data that are compared to transfer data, and transfer termination rules for interpreting the comparison results. The CT-DMA reads data from a source and writes it to a destination until the filter criteria are met.

One embodiment relates to a CT-DMA circuit. The circuit includes a data transfer interface operative to read data from a source and/or write data to a destination and memory operative to store filter criteria. The CT-DMA circuit additionally includes a comparator operative to compare transfer data to one or more filter criteria and a controller operative to terminate a DMA transfer in response to the comparator output.

Another embodiment relates to a method of transferring an unknown amount of data from a source to a destination. Data are successively read from the source and compared to predetermined pattern data. A determination is made in response to the comparison of when to terminate a transfer. Data are successively written to the destination until the transfer is terminated. These method steps are performed autonomously of a processor.

Yet another embodiment relates to a computing system. The system includes a data source operative to provide data and a data destination operative to receive data. The system also includes a CT-DMA circuit operative to perform a DMA data transfer from the source to the destination, and further operative to terminate the DMA transfer in response to one or more values of the transfer data. The system further includes a processor operative to initialize the CT-DMA circuit.

DETAILED DESCRIPTION

According to one or more embodiments, a Content-Terminated Direct Memory Access (CT-DMA) circuit transfers data of unknown length from a source to a destination, and terminates the transfer by applying filter criteria to the data "in flight." The filter criteria include pattern data to compare to data being transferred, and rules for terminating the transfer in response to the comparison.

Figure 1:
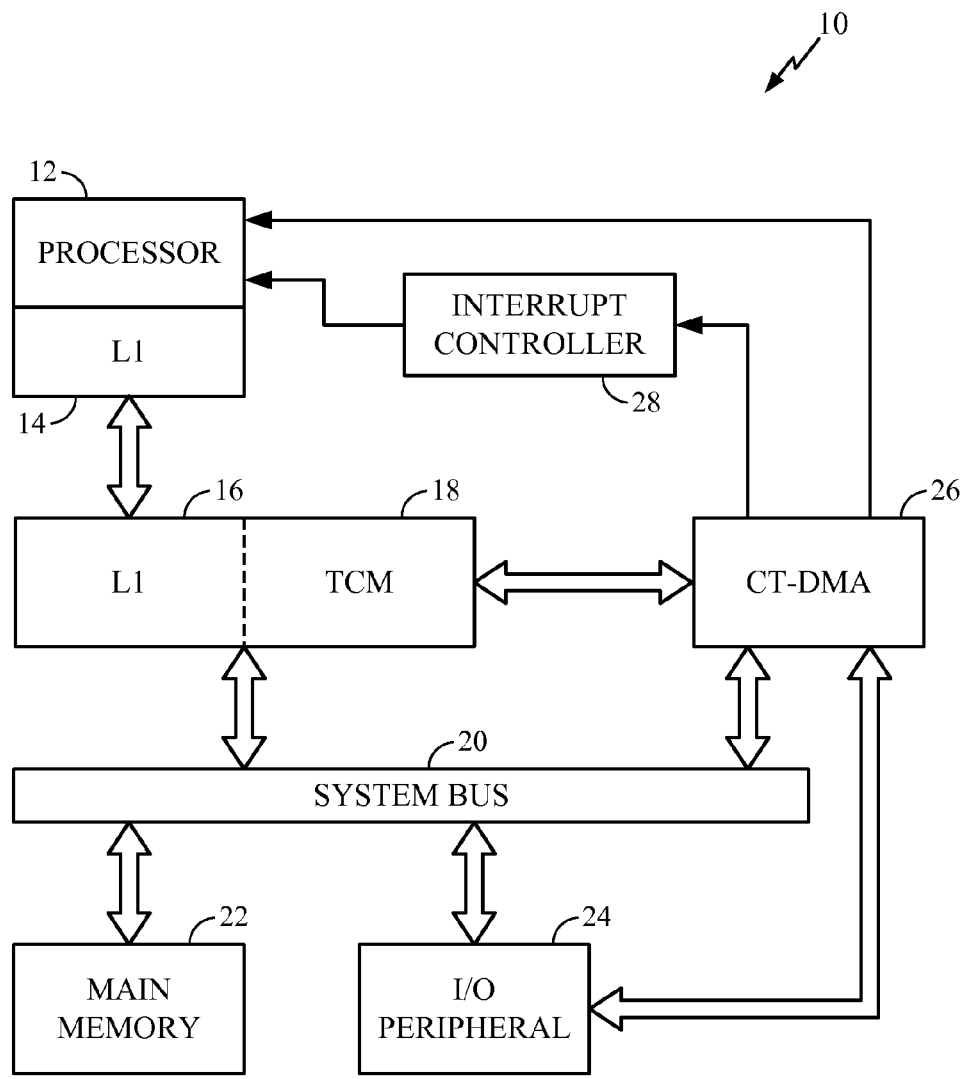
FIG. 1 is a functional block diagram of a computing system including a CT-DMA circuit.

FIG. 1 depicts a representative computing system, indicated generally by the numeral 10. The computing system 10 includes a processor 12, which may include a Level-1 (L1) cache 14. The processor 12 may comprise a stored-program microprocessor, Digital Signal Processor (DSP), or the like, as known in the art. The L1 cache 14 may be backed in the memory hierarchy by an L2 cache 16. In one embodiment, part of the memory comprising the L2 cache 16 is utilized by the processor 12 as Tightly Coupled Memory (TCM) 18. The TCM 18 is part of the main memory address space in the memory hierarchy, but is physically and logically more tightly coupled to the processor 12—for example, the processor need not arbitrate for the system bus 20 to access TCM 18. The L2 cache 16 and CT-DMA 26 read and write main memory 22 across the system bus 20. The TCM 18 and Input/Output (I/O) peripheral 24, such as for example a NIC card, wireless communication transceiver, Bluetooth interface, or the like, are slave devices on the system bus 20. The I/O peripheral 24 may transfer data into and/or out of the computing system 10.

A CT-DMA circuit 26 is a master device on the system bus 20, by which it may read and write main memory 22, TCM 18 and I/O peripheral 24. The CT-DMA circuit 26 may additionally or alternatively be connected directly to a data port of the I/O peripheral 24. Furthermore, in the embodiment depicted in FIG. 1, the CT-DMA circuit 26 is tightly integrated with the processor 12, and may directly access TCM 18 (such as by multiplexing address bits to the TCM 18 between the processor 12 and CT-DMA 26).

Following initialization by the processor 12, the CT-DMA circuit 26 transfers data from a source to a destination within the computing system 10, terminating the transfer in response to one or more values of the data. As one illustrative example, the processor 12 may direct the CT-DMA circuit 26 to transfer a character string of unknown length from main memory 22 into TCM 18, where the processor 12 may operate on the character string more efficiently.

In one or more embodiments, when the CT-DMA circuit 26 determines, in response to the data being transferred, that the transfer is complete, it terminates the transfer and may interrupt the processor 12, either directly or via an interrupt controller 28. In other embodiments, the CT-DMA circuit 26 may set a flag in a control register, and rely on the processor 12 polling the status of the flag to determine that the data transfer is complete. In other embodiments, the CT-DMA circuit 26 may signal a completed data transfer operation to the processor 12 in a variety of ways, as may be readily devised by those of skill in the art to meet the demands or preferences of any particular implementation.

As used herein, a data source refers to any memory location 22, 18, data port of a peripheral 24, or other source of data accessible by the CT-DMA circuit 26, either across the system bus 20 or by direct connection. As used herein, a data destination similarly refers to any memory 22, 18 or peripheral 24. In addition, a data destination may be the NULL destination, in which case the transfer data are discarded. Data may be advantageously "transferred" to the NULL destination for a variety of reasons, such as to determine the length of a character string (e.g., the C language operation strlen).

Figure 2:
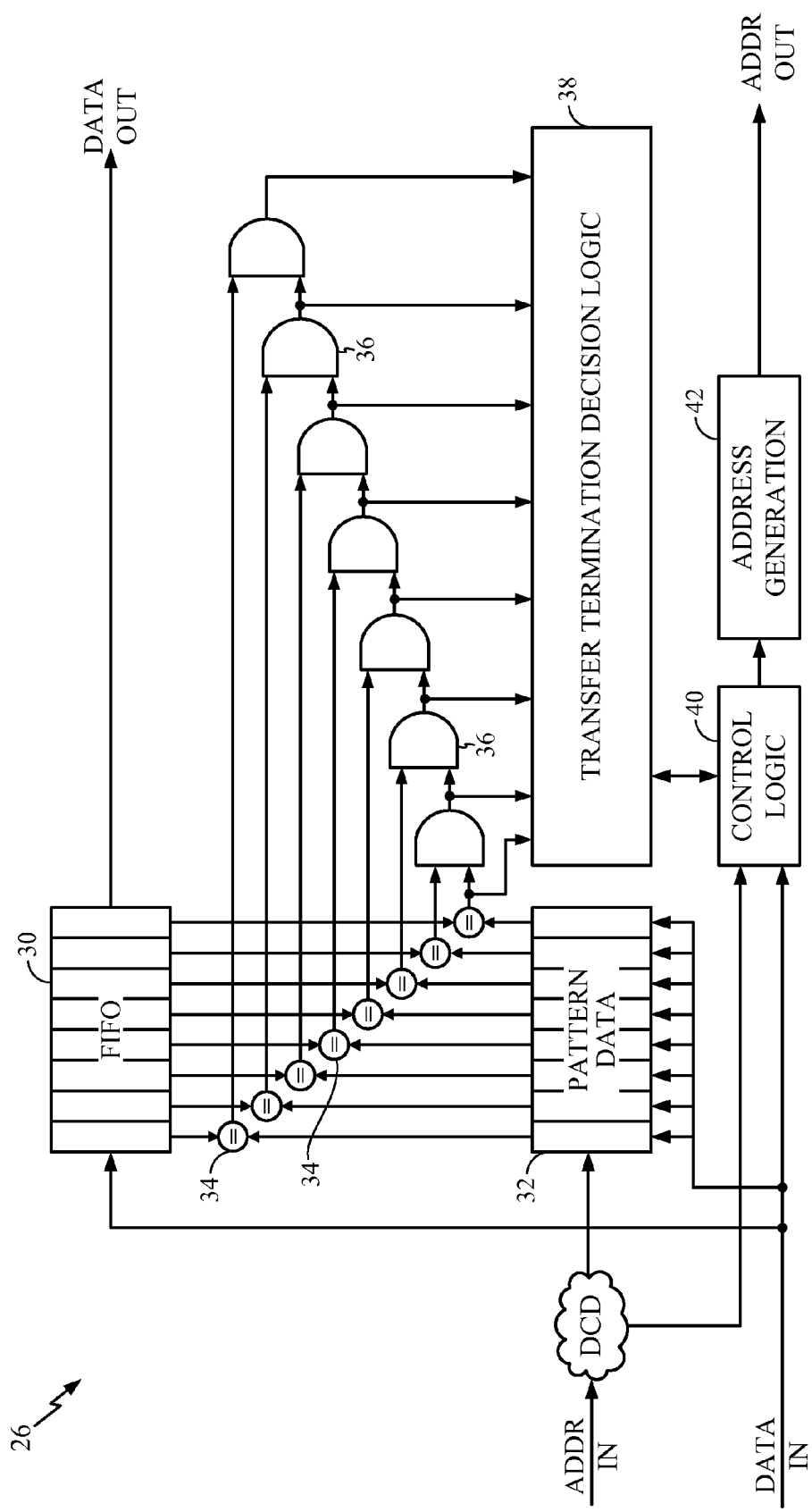
FIG. 2 is a functional block diagram of a data comparison circuit in a CT-DMA circuit.

FIG. 2 is a functional block diagram presented to explicate aspects of the data comparison functionality of one embodiment of a representative CT-DMA circuit 26. It is noted that FIG. 2 is not intended to represent actual hardware of any given CT-DMA circuit 26. Furthermore, FIG. 2 depicts a subset of CT-DMA circuit 26 functionality; numerous DMA circuits and functions not germane to the discussion are omitted from FIG. 2 for clarity.

In one embodiment, the CT-DMA circuit 26 includes a First-In, First-Out (FIFO) data buffer 30 comprising, in the example depicted, eight storage locations. The storage locations may comprise registers or memory, as known in the art, and may be organized as any of a variety of operational buffers 30. The storage locations may be of any width as desired or required (e.g., byte, halfword, word, etc.), and the data stored in each is referred to herein as a "unit" of data. Of course, the buffer 30 may comprise more or fewer than eight storage locations, as desired or required. Data read from a source during a CT-DMA data transfer are input to the FIFO 30, and depending on the results of compare operations, may be written to a destination. These data are referred to herein as transfer data.

The CT-DMA circuit 26 includes pattern data storage 32. The processor 12 may write predetermined data patterns to the pattern data storage locations 32 prior to initiating a CT-DMA data transfer. In the embodiment depicted in FIG. 2, the pattern data storage 32 mirrors the FIFO 30 in terms of the number of storage locations and their data width. In other embodiments the number of storage locations may not match. In particular, in one embodiment, the FIFO 30 may comprise one or more storage locations, and the pattern data storage 32 may comprise a plurality of storage locations greater than the number in the FIFO 30. In this case, a control circuit such as a state machine may successively compare each unit of transfer data in the FIFO 30 to more than one data pattern unit. In one embodiment, whether or not the number of data storage locations match, the data unit width between the FIFO 30 and pattern data storage 32 may be different. For example, a single byte of pattern data may be compared to, e.g., the same byte of every transfer data word, each byte of every data transfer word, or the like. These data comparison procedures may be programmable, and may be included in the filter criteria. In one embodiment, such as where particular pattern data for an application are known, the pattern data storage 32 may comprise one or more hardwired bit patterns.

As transfer data flow through the FIFO 30, they are compared to corresponding pattern data in n-bit comparators 34 (where n matches the data unit width—i.e., the width of the FIFO 30 and pattern data 32 entries). The outputs of the comparators 34 are logically AND-ed together to detect a match between one or more units of transfer data and pattern data. In one embodiment, the AND functions 36 are cascaded, as depicted in FIG. 2, with each intermediate output provided to the transfer termination decision logic 38. The transfer termination decision logic 38 may, in the embodiment depicted, detect a transfer-terminating comparison comprising from one to eight data units. For example, the transfer termination rules may require up to eight characters in a character string to match predetermined characters, in a specific order, in order to terminate the transfer.

The rules under which the transfer termination decision logic 38 operates are provided by the processor 12 to CT-DMA control logic 40, which in turn configures the transfer termination decision logic 38. These transfer termination rules, together with the pattern data, are referred to herein as filter criteria. In general, the inventive CT-DMA circuit 26 may support a rich set of filter criteria, providing a broad range of transfer-terminating functionality. The list below provides a few representative and non-limiting examples of functionality provided by embodiments of the CT-DMA circuit 26 by altering the filter criteria and data destination; some functions include the C language commands that may be directly implemented by the associated functionality:

data transfer terminated by predetermined key (strcpy);
NULL destination: copy is not performed or is discarded (strcmp);
determine the length of a transfer (strlen)—either incident to a transfer or performing only the count by transferring to the NULL destination;
a maximum length may be associated with the transfer (strnlen, strncpy, strncmp);
data transfer terminated by multiple-unit key (HTML tag);
logical combinations (AND, OR) of comparison results on different keys;
transfer data and pattern data match a predetermined number of times;
inverted match case (i.e., terminate transfer when transfer data fails to match pattern data).

The control logic 40 additionally includes a variety of status registers, counters, and logic (not shown), to implement conventional DMA transfer functionality as well as a rich set of content-terminated DMA. For example, by controlling the address generation circuit 42, the control logic 40 may support a broad range of CT-DMA transfer functionality, such as:

- increment or not increment source and/or destination addresses (e.g., streaming data);
- perform scatter/gather operations to transfer data between source and destination having different word width;
- ascending or descending transfers (i.e., increment or decrement successive addresses);
- stride setup (row/column translation), including using the NULL destination to selectively transfer patterns or not content-controlled chained DMA transfers.

Chained DMA transfers may be controlled by the content of transfer data in a variety of ways. For example, one or more values of transfer data in a current DMA operation may determine which DMA channel to utilize for a subsequent DMA operation. As another example, the source and/or destination, the stride, and/or the count for a subsequent DMA operation may be determined by values of the transfer data. In one embodiment, a match of transfer data against pattern data may control subsequent DMA operations by directing the CT-DMA to different memory locations containing the DMA control parameters (source, destination, etc.).

Figure 3:
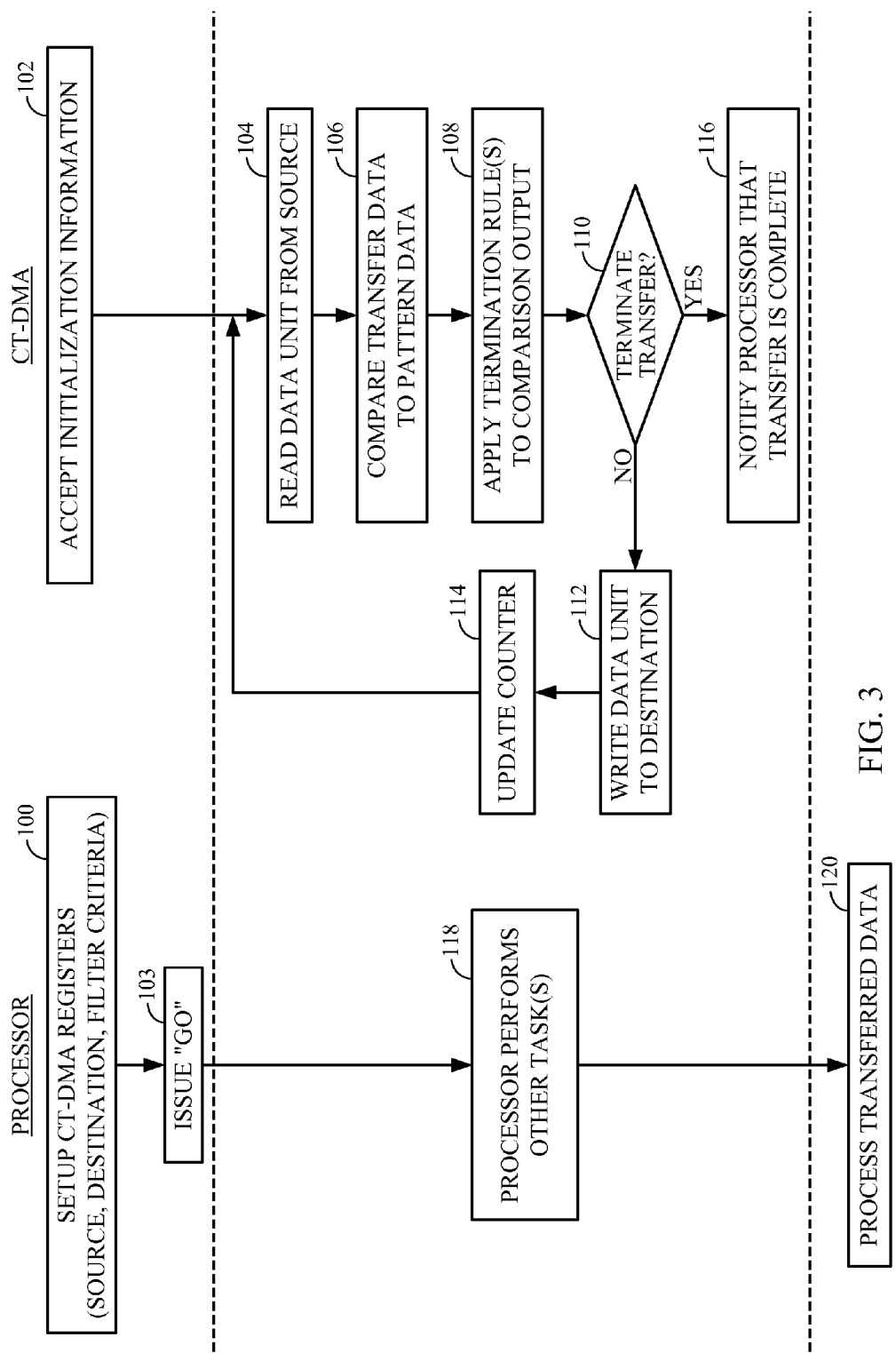
FIG. 3 are flow diagrams of a method of transferring an unknown amount of data from a source to a destination.

FIG. 3 depicts flow diagrams of a method of transferring an unknown amount of data from a source to a destination, from the perspective of both a processor 12 (left) and a CT-DMA circuit 26 (right). The method begins when the processor 12 sets up the transfer by providing initialization information, such as source and destination addresses or identifiers and filter criteria (including both pattern data and transfer termination rules) to the CT-DMA circuit 26 (block 100). This may comprise writing the information to registers and/or pattern data storage 32 on the CT-DMA circuit 26, or alternatively writing the information to memory and writing a pointer to the memory location to a CT-DMA circuit 26 register. The CT-DMA circuit 26 correspondingly accepts the initialization information (block 102), either directly or by reading it from memory. The processor 12 then sends a GO indication to the CT-DMA circuit 26 (block 103) to begin the transfer. The GO indication may comprise writing a flag to a control register in the CT-DMA control logic 40, asserting a signal between the processor 12 and the CT-DMA circuit 26, or by other means known in the art.

The CT-DMA circuit 26 begins the transfer by reading a data unit from the source (block 104), which may comprise a memory location or a peripheral port, into a buffer such as the FIFO 30. The data unit read may require one or more read operations directed to the source, depending on the width of the source data interface. The CT-DMA circuit 26 compares the transfer data in the FIFO 30 to pattern data 32 provided by the processor 12 (block 106). Transfer termination decision logic 38 in the CT-DMA circuit 26 applies transfer termination rules provided by the processor 12 to the results of the comparisons (block 108). If the transfer termination decision logic 38 indicates that the transfer should not yet be terminated (block 110), the CT-DMA circuit 26 writes a unit of data to the destination memory address or peripheral port (block 112), which may require one or more write operations directed to the destination. The CT-DMA circuit 26 then updates a transfer count (such as by incrementing or decrementing a counter) (block 114), and reads another unit of transfer data from the source (block 104).

When the CT-DMA circuit 26 determines—based on applying the transfer termination rules to the transfer data and pattern data comparison results—that the transfer should terminate, it notifies the processor 12. As described above, this notification may comprise asserting an interrupt, writing a flag or other predetermined data to a predetermined location, such as a status register in control logic 40 or a predetermined location in memory 22, or other notification means.

In one or more embodiments, where the processor 12 desires to maintain the terminating key as part of the data transfer, the terminate transfer decision (block 110) may cause the CT-DMA circuit 26 to cease reading data from the source (block 104), but continue writing transfer data to the destination (block 112) and updating the transfer count (block 114) until the terminating key has been transferred. In some embodiments, the termination behavior is programmable— that is, the decision whether or not to write the termination key as part of the transfer is specified by the processor 12 as part of the initialization information.

The dashed lines in FIG. 3 depict the synchronization between the processor 12 and the CT-DMA circuit 26. From the time the processor 12 issues the GO indication (block 103) until the CT-DMA circuit 26 notifies the processor 12 that the transfer is complete (block 116), the processor 12 is free to perform other tasks (block 118), or to go into a sleep mode if no other tasks are pending. Upon receiving a notification from the CT-DMA circuit 26 that the transfer is complete (block 116), the processor may process the transferred data at the destination (block 120), or otherwise proceed with post-data-transfer activity.

Embodiments of the CT-DMA circuit 26 may significantly improve processor performance by performing routine data transfers of unknown length (and related operations, such as determining a string length), freeing the processor 12 to perform other tasks. Additionally, the CT-DMA circuit 26 may save power, such as by avoiding the repeated lookups in the L1 cache 14 and L2 cache 16 associated with each data unit read from the source and write to the destination.

The present invention may, of course, be carried out in other ways than those specifically set forth herein without departing from essential characteristics of the invention. The present embodiments are to be considered in all respects as illustrative and not restrictive, and all changes coming within the meaning and equivalency range of the appended claims are intended to be embraced therein.

What is claimed is:

1. A Content-Terminated Direct Memory Access (CT-DMA) circuit, comprising:
   at least one data transfer interface to receive and write transfer data and to receive filter criteria, wherein the filter criteria comprises pattern data and a transfer termination rule, the transfer termination rule indicating a number of units of the transfer data to match to the pattern data;
   memory operative to store the filter criteria;
   a comparison circuit having access to a data bus, the comparison circuit including multiple comparators and multiple logic gates, wherein the comparators are operative to compare units of the transfer data to the pattern data and wherein the multiple logic gates are configured to provide a multi-bit comparison result that indicates how many of the units of the transfer data match the pattern data; and
   a transfer termination decision logic circuit and a control logic circuit operative to terminate a DMA transfer in response to the comparison result.

2. The CT-DMA circuit of claim 1, wherein the comparison circuit is operative to compare each unit of transfer data to two or more units of pattern data.

3. The CT-DMA circuit of claim 2, wherein the transfer termination rule is satisfied when none of the units of transfer data matches the two or more units of pattern data.

4. The CT-DMA circuit of claim 2, wherein the transfer termination rule is satisfied when at least one unit of transfer data matches the two or more units of pattern data a number of times.

5. The CT-DMA circuit of claim 1, wherein the control logic circuit is operative to terminate the DMA transfer by asserting an interrupt.

6. The CT-DMA circuit of claim 1, wherein the control logic circuit is operative to terminate the DMA transfer by writing a programmable value to a predetermined location of the memory.

7. The CT-DMA circuit of claim 1, wherein the control logic circuit is further operative to initiate another DMA transfer.

8. The CT-DMA circuit of claim 7, wherein initiating another DMA transfer comprises reading DMA control parameters from a memory location.

9. A method of transferring data from a source to a destination, the method comprising:
sending filter criteria to a Content-Terminated Direct Memory Access (CT-DMA) circuit that includes multiple comparators and multiple logic gates to generate comparison results based on outputs of the comparators, wherein the filter criteria comprises pattern data and a transfer termination rule, the transfer termination rule indicating whether a multi-unit key is to be used for comparison;
successively sending transfer data to the CT-DMA circuit; and
receiving a termination signal from the CT-DMA circuit in response to a control logic circuit and a transfer termination decision circuit of the CT-DMA circuit identifying a transfer termination event by receiving the comparison results indicating how many units of the transfer data match units of the pattern data and determining that the comparison results indicate that the transfer data matches the multi-unit key.

10. The method of claim 9, wherein the transfer termination rule is satisfied when the multi-unit key matches the transfer data.

11. The method of claim 9, wherein the filter criteria indicates use of a single programmable key and indicates that the single programmable key is to match the transfer data a programmable number of times.

12. A computing system, comprising:
a Content-Terminated Direct Memory Access (CT-DMA) circuit operative to receive filter criteria, wherein the filter criteria comprises pattern data and a transfer termination rule, the transfer termination rule indicating a number of units of the transfer data to match to the pattern data, and further operative to compare transfer data to the pattern data using a comparison circuit that includes multiple comparators that provide outputs to a set of logic gates, wherein the set of logic gates generates comparison results indicating how many of the multiple comparators indicate a match condition, wherein the comparison results are received at transfer termination decision circuitry and control logic circuitry and compared to the number to determine whether the transfer data satisfies the transfer termination rule, and wherein the CT-DMA circuit is further operative to terminate data transfer in response to the comparison results indicating that the transfer data satisfies the transfer termination rule; and
wherein the filter criteria is received at the CT-DMA circuit before the CT-DMA circuit receives the transfer data.

13. The system of claim 12, wherein a processor writes the filter criteria to one or more memory locations in the CT-DMA circuit.

14. The system of claim 12, wherein a processor initializes the CT-DMA circuit by writing the filter criteria to memory and providing the CT-DMA circuit a pointer to the memory.

15. The CT-DMA circuit of claim 1, wherein address data is provided to a decoder and the transfer data is provided to a First-In, First-Out (FIFO) buffer.

16. The CT-DMA circuit of claim 15, wherein the comparison circuit comprises n-bit comparators, wherein n matches a width of the FIFO buffer.

17. The CT-DMA circuit of claim 16, wherein n matches a number of storage locations in the FIFO buffer.

18. The CT-DMA circuit of claim 16, wherein outputs of the n-bit comparators are logically AND-ed together to detect a match between a unit of transfer data and two or more units of pattern data.

19. The CT-DMA circuit of claim 18, wherein AND functions are cascaded with each intermediate output provided to the transfer termination decision logic circuit.

20. The CT-DMA circuit of claim 16, wherein pattern data storage includes a plurality of storage locations that is greater than the number of storage locations in the FIFO buffer.

21. The CT-DMA circuit of claim 1, further comprising a processor operative to select the transfer termination rule from at least two different transfer termination rules.

22. The CT-DMA circuit of claim 21, wherein the transfer termination rule is a logic function.

23. The CT-DMA circuit of claim 1, wherein the transfer data comprises a character string.

24. The method of claim 9, further comprising sending one or more second filter criteria to the CT-DMA circuit, wherein the second filter criteria comprises second pattern data that is different than the pattern data and a second transfer termination rule that is different than the transfer termination rule.

25. The method of claim 9, wherein the transfer termination rule identifies a logic function to be performed on different keys.

26. The system of claim 12, wherein the transfer termination rule identifies a logic function to be performed on different keys and wherein the logic function is an OR function.

27. The system of claim 12, wherein the transfer termination rule identifies a logic function to be performed on different keys and wherein the logic function is an AND function.

28. The system of claim 27, wherein a first transfer termination rule is satisfied when the AND function is satisfied.

29. The system of claim 28, wherein a second transfer termination rule is not satisfied when the AND function is satisfied.

30. A method comprising:
receiving transfer data and filter criteria at a Content-Terminated Direct Memory Access (CT-DMA) circuit, wherein the filter criteria comprises pattern data and a transfer termination rule, the transfer termination rule indicating a number of units of the transfer data to match to units of the pattern data;
storing the filter criteria at a memory;
comparing the transfer data from a data bus to the pattern data to generate comparison results, wherein a set of comparators compares units of the transfer data to units of the pattern data and wherein a set of logic gates generates the comparison results based on outputs of the comparators; and
applying the transfer termination rule to the comparison results at a transfer termination decision logic circuit and control logic circuit to determine whether a number of matches of units of the transfer data to units of the pattern data satisfies the number;

wherein receiving the transfer data, comparing the transfer data, and applying the transfer termination rule are performed iteratively until the transfer termination rule is satisfied; and upon detecting that the transfer termination rule is satisfied, terminating a DMA transfer via the control logic circuit responsive to the transfer termination decision logic circuit.

31. The method of claim 30, further comprising comparing each unit of transfer data to two or more units of pattern data.

32. The method of claim 31, wherein the transfer termination rule is satisfied when none of the units of transfer data matches the two or more units of pattern data.

33. The method of claim 31, wherein the transfer termination rule is satisfied when at least one unit of transfer data matches the two or more units of pattern data a predetermined number of times.

* * * * *